United States Patent [19]

Li et al.

[11] Patent Number: 5,734,888

[45] Date of Patent: *Mar. 31, 1998

[54] APPARATUS AND METHOD OF MODIFYING A DATABASE QUERY

[75] Inventors: Shih-Gong Li; Bruce Allan Tate, both of Austin, Tex.

[73] Assignee: International Business Machines Corporation, Armonk, N.Y.

[*] Notice: The term of this patent shall not extend beyond the expiration date of Pat. No. 5,608,899.

[21] Appl. No.: 787,653

[22] Filed: Jan. 23, 1997

Related U.S. Application Data

[63] Continuation of Ser. No. 72,618, Jun. 4, 1993, Pat. No. 5,608,899.

[51] Int. Cl.⁶ .................................................. G06F 17/30
[52] U.S. Cl. ........................ 395/604; 395/140; 395/326; 395/339; 395/352
[58] Field of Search .................................... 395/613, 604, 395/326

[56] References Cited

U.S. PATENT DOCUMENTS

| | | | |
|---|---|---|---|
| 4,506,326 | 3/1985 | Shaw et al. | 395/604 |
| 4,972,328 | 11/1990 | Wu et al. | 395/75 |
| 4,989,610 | 2/1991 | Patton et al. | 128/695 R |
| 5,019,961 | 5/1991 | Addesso et al. | 364/192 |
| 5,053,956 | 10/1991 | Donald et al. | 395/560 |
| 5,161,225 | 11/1992 | Abraham et al. | 395/614 |
| 5,168,441 | 12/1992 | Onarheim et al. | 364/146 |
| 5,172,245 | 12/1992 | Kita et al. | 358/403 |
| 5,265,246 | 11/1993 | Li et al. | 395/604 |
| 5,319,560 | 6/1994 | Adams et al. | 364/439 |
| 5,414,809 | 5/1995 | Hogan et al. | 395/349 |
| 5,426,781 | 6/1995 | Kaplan et al. | 395/604 |
| 5,579,471 | 11/1996 | Barber et al. | 395/326 |
| 5,608,899 | 3/1997 | Li et al. | 395/604 |

OTHER PUBLICATIONS

"Visual Query Specification in a Multimedia Database System", Keim et al., Visualization 1992 Conference, IEEE, Mar. 1992.

*Primary Examiner*—Thomas G. Black
*Assistant Examiner*—Hosain T. Alam
*Attorney, Agent, or Firm*—Volel Emile

[57] ABSTRACT

An apparatus for modifying a database query including apparatus for graphically displaying in at least two dimensions data obtained from a database by the database query, apparatus for selecting at least one portion of the graphically displayed data, and apparatus for modifying the database query according to the selected portion of the graphically displayed data. In addition, a method for modifying a database query including the steps of graphically displaying in at least two dimensions data obtained from a database by the database query, selecting at least one portion of the graphically displayed data, and modifying the database query according to the selected portion of the graphically displayed data.

20 Claims, 13 Drawing Sheets

5,734,888

APPARATUS AND METHOD OF MODIFYING A DATABASE QUERY

This is a continuation of application Ser. No. 08/072,618, filed on Jun. 4, 1993 now U.S. Pat. No. 5,608,899.

RELATED PATENT APPLICATION

Related patent applications include copending application U.S. Ser. No. 08/072,626 filed on the same date as the present application, entitled "Database Search Facility Having Improved User Interface", now abandoned hereby incorporated by reference.

TECHNICAL FIELD

This invention relates generally to computer stored databases and more particularly to searching a database utilizing a graphical user interface.

BACKGROUND OF THE INVENTION

Computer stored databases have attracted an increasing amount of interest, not only because of the rapid expansion in the data stored and retrieved by these databases, but also as a result of the data relationships which can be established during the storage or retrieval processes. With the growing prevalence of relational databases, the training and experience of a typical end user has decreased as available resources have increased. Novice users of databases have been particularly desirous of improvements in the graphical user interfaces to control the database applications.

One of the more difficult elements of problem solving when using a database is often the identification of the sources that cause a particular problem. Search statements for queries are usually used for searching information stored in a database in an organized fashion to help problem solving. When users have few clear ideas about how to construct a query for solving a problem, a common approach is to start by examining an initial query report resulting from an initial query for more information. Based on this information, the user then decides how to narrow the search further within the database. If these narrowed searches do not produce the desired result then the user must back up to a previous search statement and try again.

Current search techniques are cumbersome, inhibiting efficient query formulation. Usually, query reports are output only and query formulations are input only. When users have no ideas about what exact information is required to solve a problem, they tend to look in initial query report for more information and then decide how to narrow the search further by modifying the query formulation.

DISCLOSURE OF THE INVENTION

The present invention includes an apparatus for modifying a database query including apparatus for graphically displaying in at least two dimensions data obtained from a database by the database query, apparatus for selecting at least one portion of the graphically displayed data, and apparatus for modifying the database query according to the selected portion of the graphically displayed data. In addition, the present invention includes a method for modifying a database query including the steps of graphically displaying in at least two dimensions data obtained from a database by the database query, selecting at least one portion of the graphically displayed data, and modifying the database query according to the selected portion of the graphically displayed data.

A further understanding of the nature and advantages of the present invention may be realized by reference to the remaining portions of the specification and the drawings.

BEST MODE FOR CARRYING OUT THE INVENTION

This disclosure describes a graphical user interface that allows a user to dynamically update a database query statement. In the preferred embodiment, the user should be able to specify an area, a category, or a section in an output graph for generating conditions to the database query statement. These graphs could include line graphs, bar charts, pie charts and other well known methods of displaying output in a graphical manner. In addition, a check box facility may be used as described below. Direct manipulation of the graph then results in corresponding changes to the database query that was used to generate the graph, resulting in a more complete problem solving tool.

Figure 1:
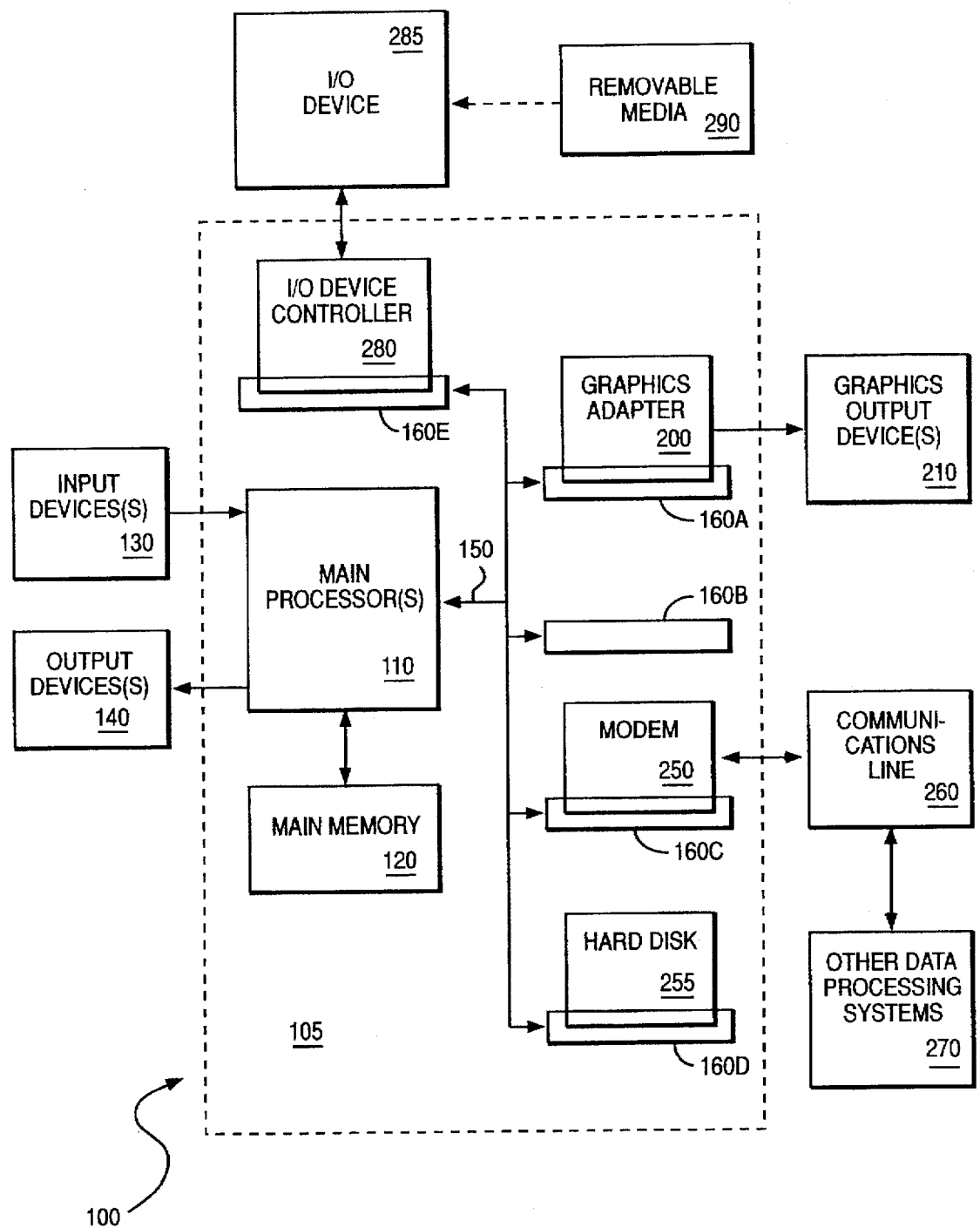
FIG. 1 is a block diagram of a typical digital computer utilized by a preferred embodiment of the invention.

FIG. 1 is a block diagram of a typical digital computer 100 utilized by a preferred embodiment of the invention. The computer includes main processor(s) 110 coupled to a main memory 120 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 140 may include a text monitor, plotter or other types of output devices. The main processor may also be coupled to graphics output device(s) 210 such as a graphics display through a graphics adapter 200. Graphics adapter 200 may be located in an adapter slot 160A. Graphics adapter 200 receives instructions regarding graphics from main processor 110 on bus 150, thereby rendering the desired graphics output from the main processor. A modem or other communications adapter 250 and a hard disk 255 may also be located in slots 160C and 160D to provide communications with main processor 110 across bus 150. Modem 250 may communicate with other data processing systems 270 across communications line 260. Computer readable removable media 290, such as a magnetic diskette or a compact disc, may be inserted into an input/output device 285, such as a disk drive or a CD-ROM (compact disc-read only memory) driver. Data is read from or written to the removable media by the I/O device under the control of the I/O device controller 280. The I/O device controller communicates with the main processor through slot 160E across bus 150. Main memory 120, hard disk 255 and removable media 290 are all referred to as memory for storing data for processing by processor 110.

The power and usability of database graphic solutions, particularly business graphic solutions, could be drastically improved by allowing user input on the graphic output screens. When looking at a graph, the user may discover a certain range of attribute values that needs to be investigated further. In the preferred embodiment, an input capability is integrated into the graphical output such that the graph becomes a combination of information display and input vehicle. Using such an integrated system, the user may define conditions directly on the graphical output, thereby modifying the database query that was used to generate the graphical output. This query modification capability can either be invoked automatically when the graph is displayed or be explicitly started by a user's actions.

Figure 2A:
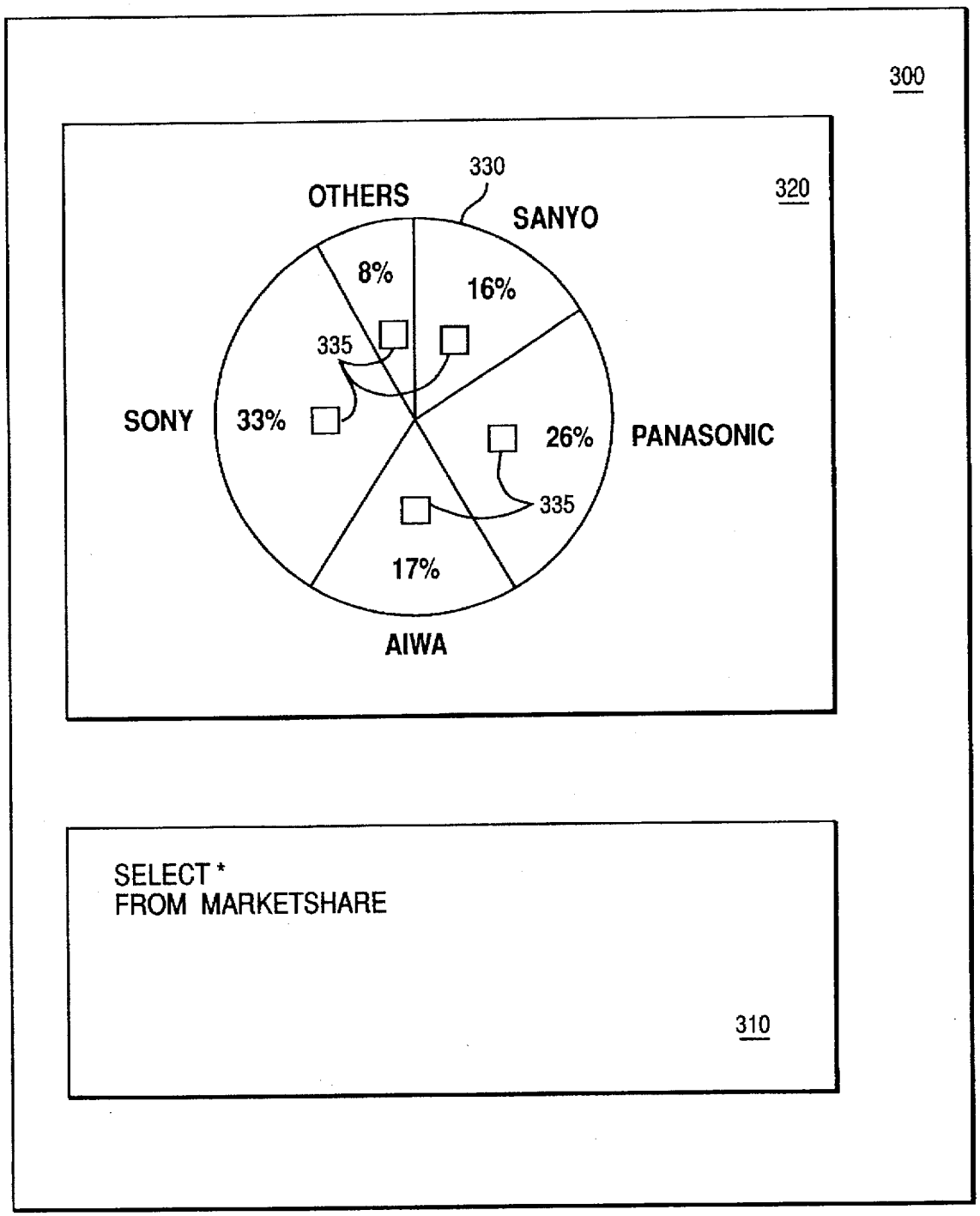
FIGS. 2A-2B illustrate generating and utilizing a pie chart according to a preferred embodiment of the invention.
Figure 2B:
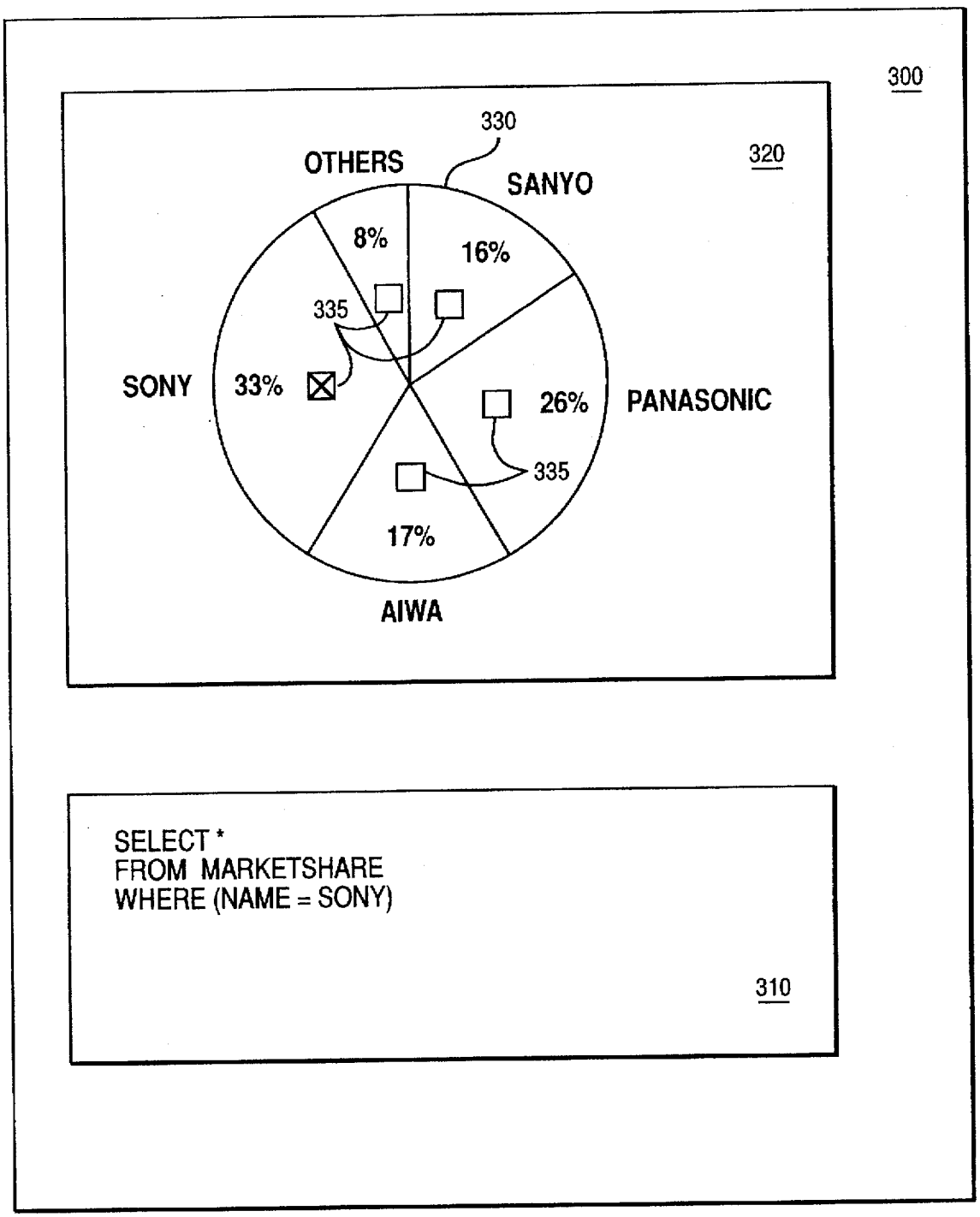

FIGS. 2A–2B illustrate generating and utilizing a pie chart according to a preferred embodiment of the invention. For a pie chart, each piece of pie displays specific information belonging to a certain category. In FIG. 2A, a display 300 has two open windows, a query window 310 and a graph window 320. As illustrated, the user has already entered a database query statement into query window 310 and the system has read the database and generated a pie chart 330 in the graph window 320. In the illustrated example, any categories with small percentages are automatically grouped into a category called "OTHERS". In the preferred embodiment, check boxes 335 are provided in each category of the pie chart. Using a mouse, the user may request more detailed information about a category by using a mouse to move the cursor over a check box corresponding to the desired category and clicking the mouse button. The check box may also be turned back off by merely clicking the mouse button again. As shown in FIG. 2B, when a check box for a category such as "SONY" is checked, the query statement used to generate the original chart is modified to reflect the selection. In addition, the user may select multiple categories by selecting multiple check boxes. When multiple boxes are checked, these conditions are preferably in logical OR relationships with each other. In an alternative embodiment, rather than using a check box or boxes, the user may select one or more categories by simply selecting the desired portion or portions of the pie chart. As each selection is made, the query statement displayed in the query window is modified to reflect the selection. The user may also perform additional modifications to the query statement directly in the query window. Upon completing the selection process, the user may then press enter or press a second mouse button. The database will be queried with the modified query statement and the results will be displayed in the graph window. At this point, the user may again modify the query statement by selecting portions of the graph or by modifying the query statement in the query window.

Figure 3A:
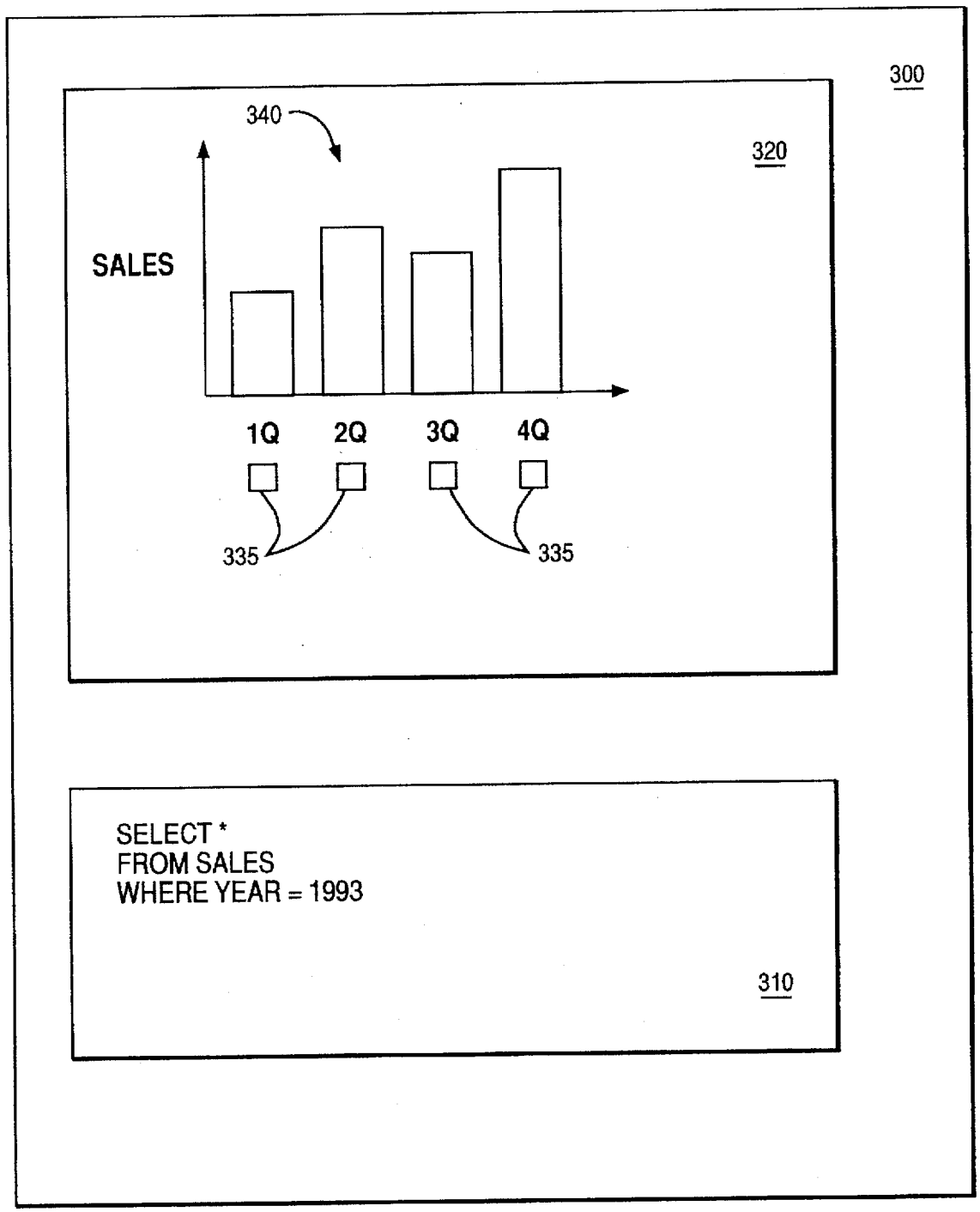
FIGS. 3A-3E illustrate generating and utilizing various charts according to a preferred embodiment of the invention.
Figure 3B:
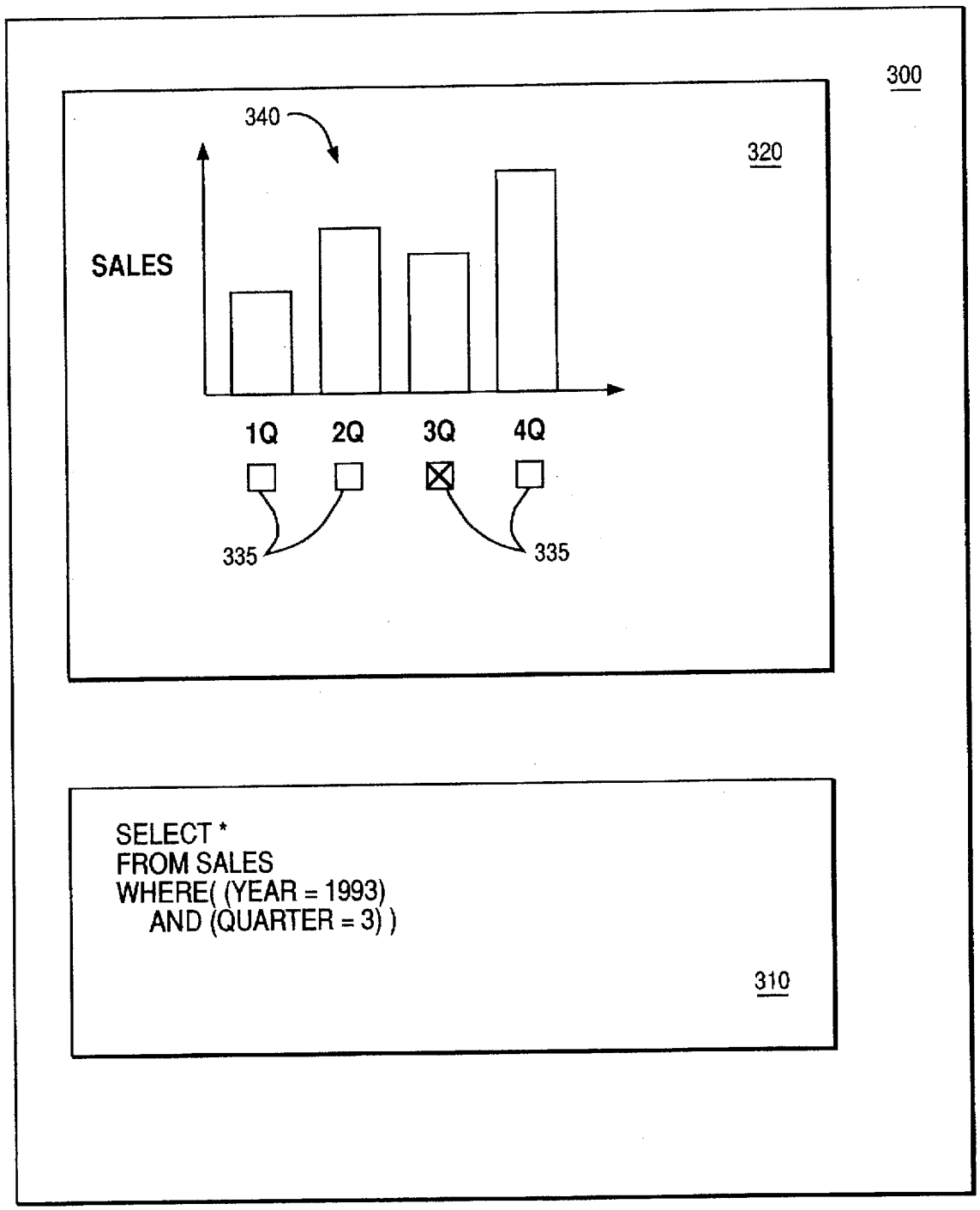

FIGS. 3A–3E illustrate generating and utilizing various charts according to a preferred embodiment of the invention. In FIG. 3A, display 300 has the same two open windows described above with reference to FIG. 2A, query window 310 and graph window 320. As illustrated, the user has already entered a database query statement into query window 310 and the system has read the database and generated a bar chart 340 in graph window 320. For a bar chart, each bar displays specific information belonging to a certain category. In the preferred embodiment, check boxes 335 are provided below each category of the bar chart for use as described above with reference to the pie chart. In an alternative embodiment, the user may select a desired bar rather than selecting a corresponding check box. FIG. 3B illustrates that the user has selected the third quarter to see why sales may have dipped in that quarter. However, the user may want to see the results in a line chart to more fully understand the data. Therefore, as is well known in the art, the user may select from a pull down menu that the result of the modified query be displayed as a line chart.

Figure 3C:
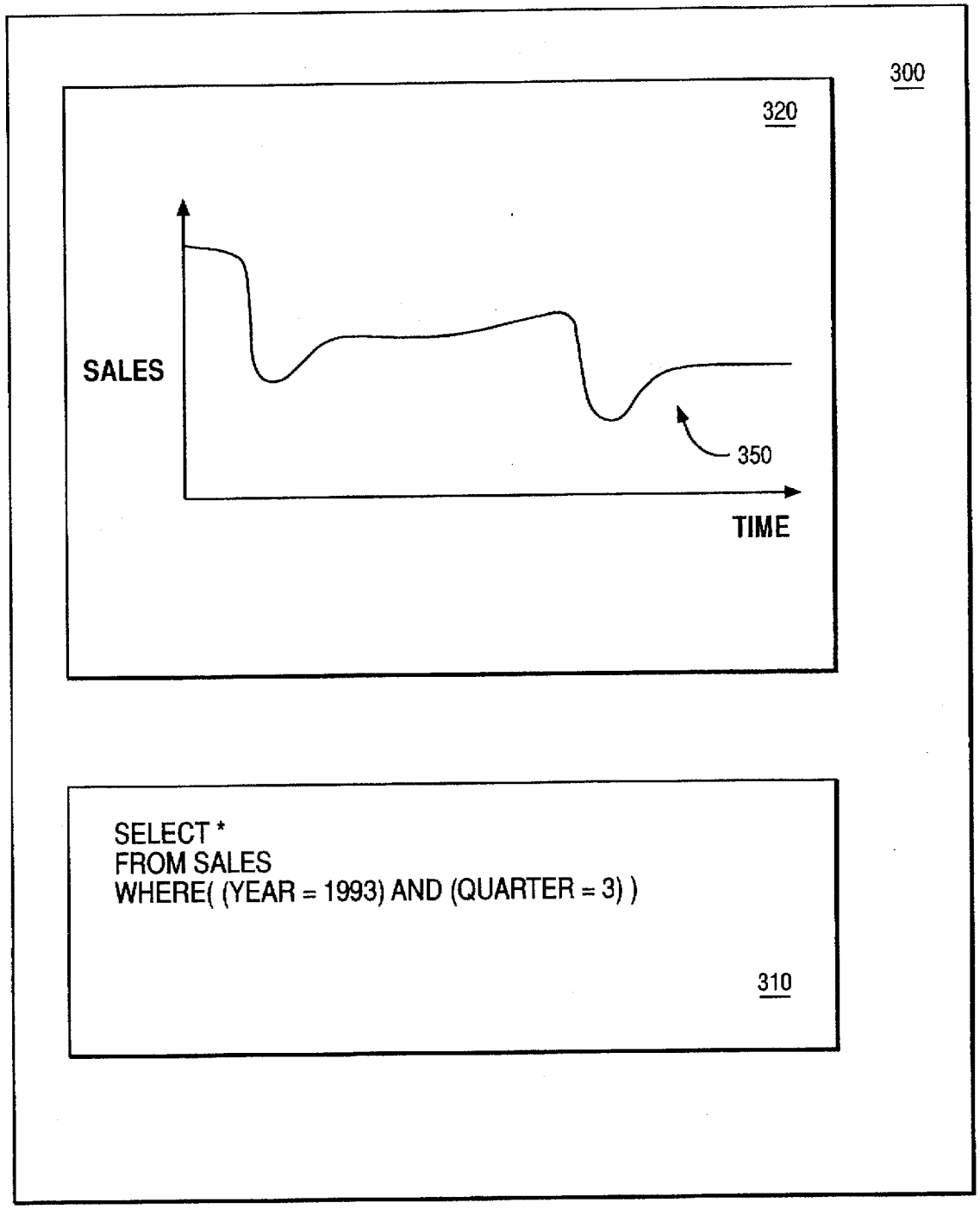
Figure 3D:
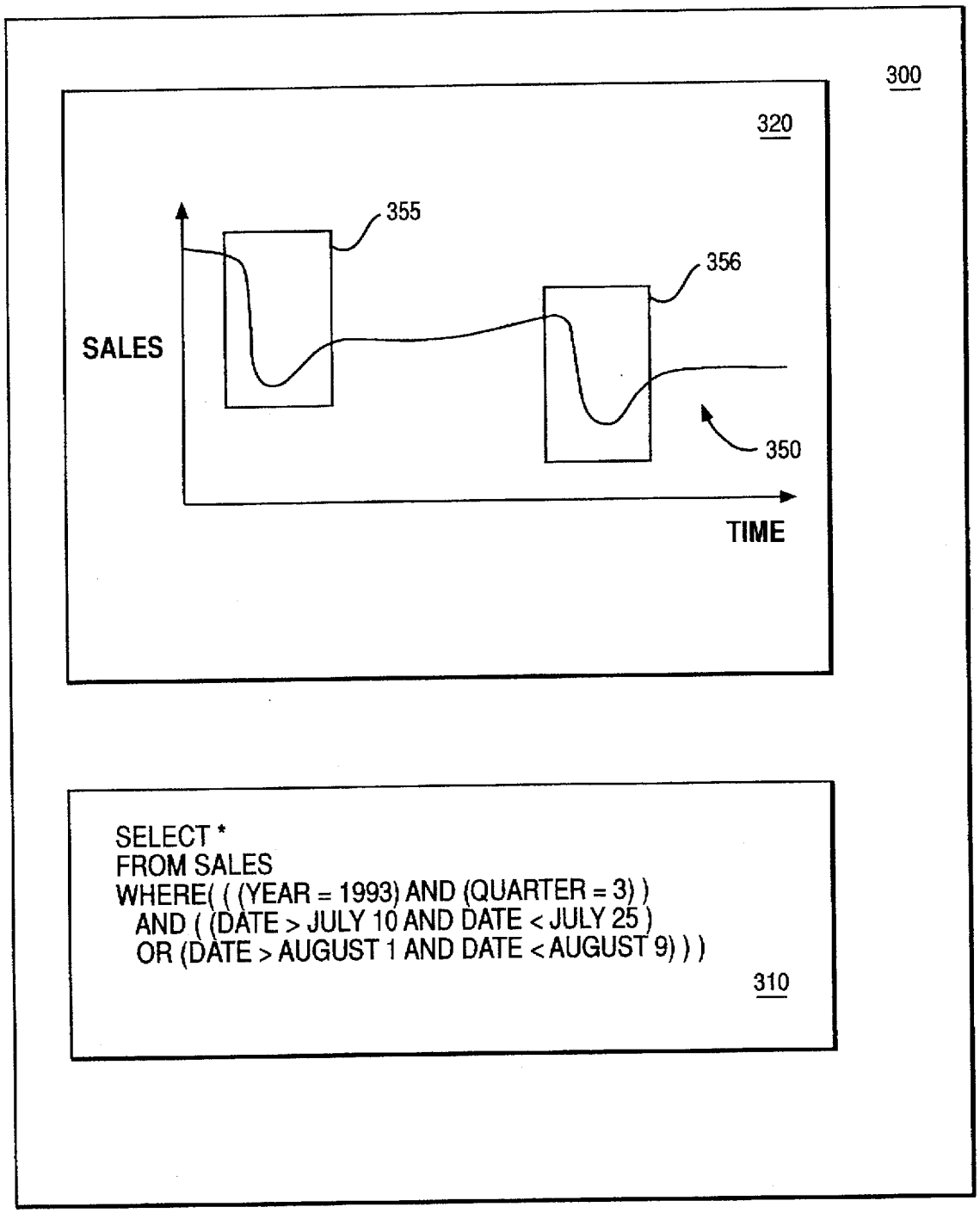
Figure 3E:
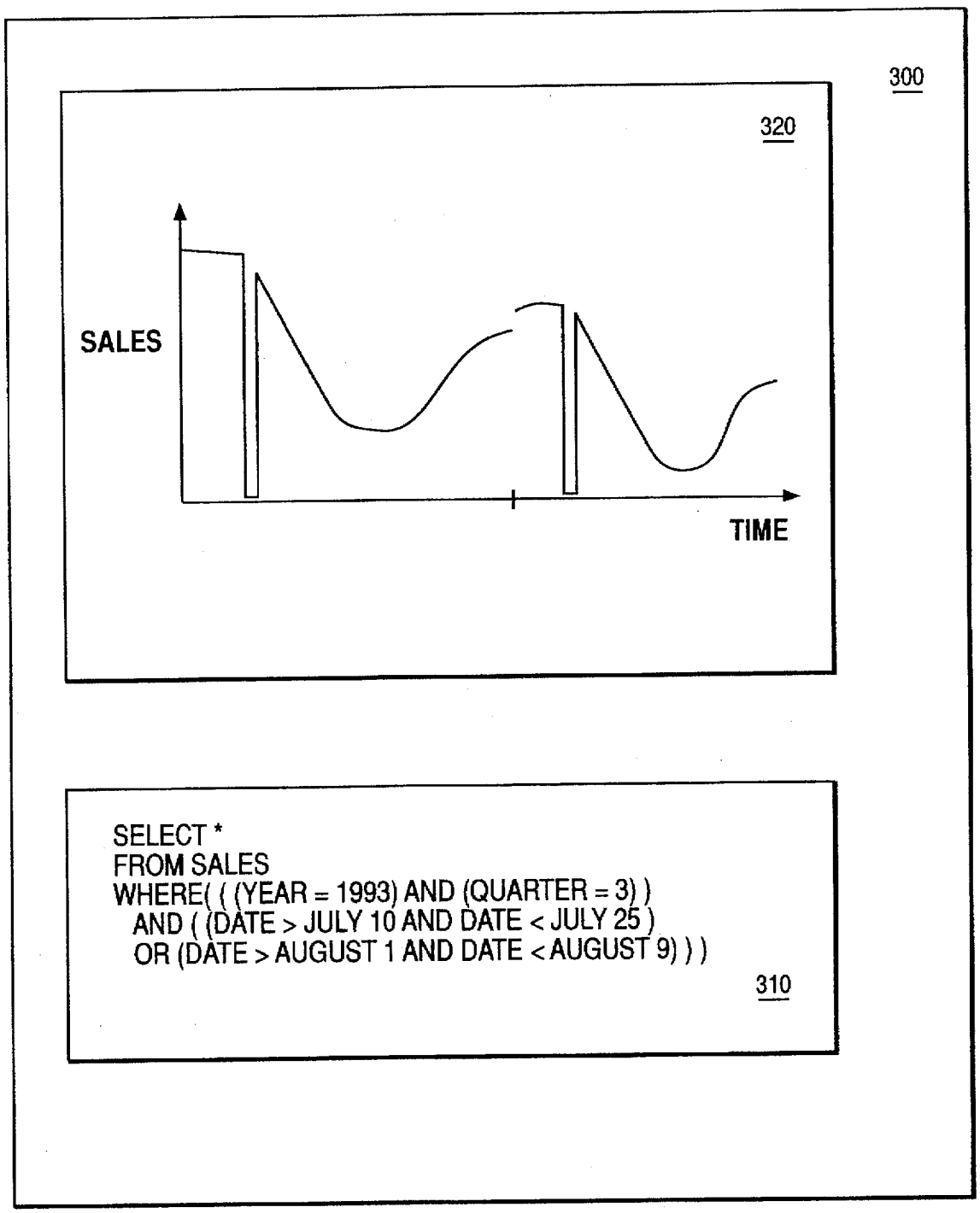
Figure 4A:
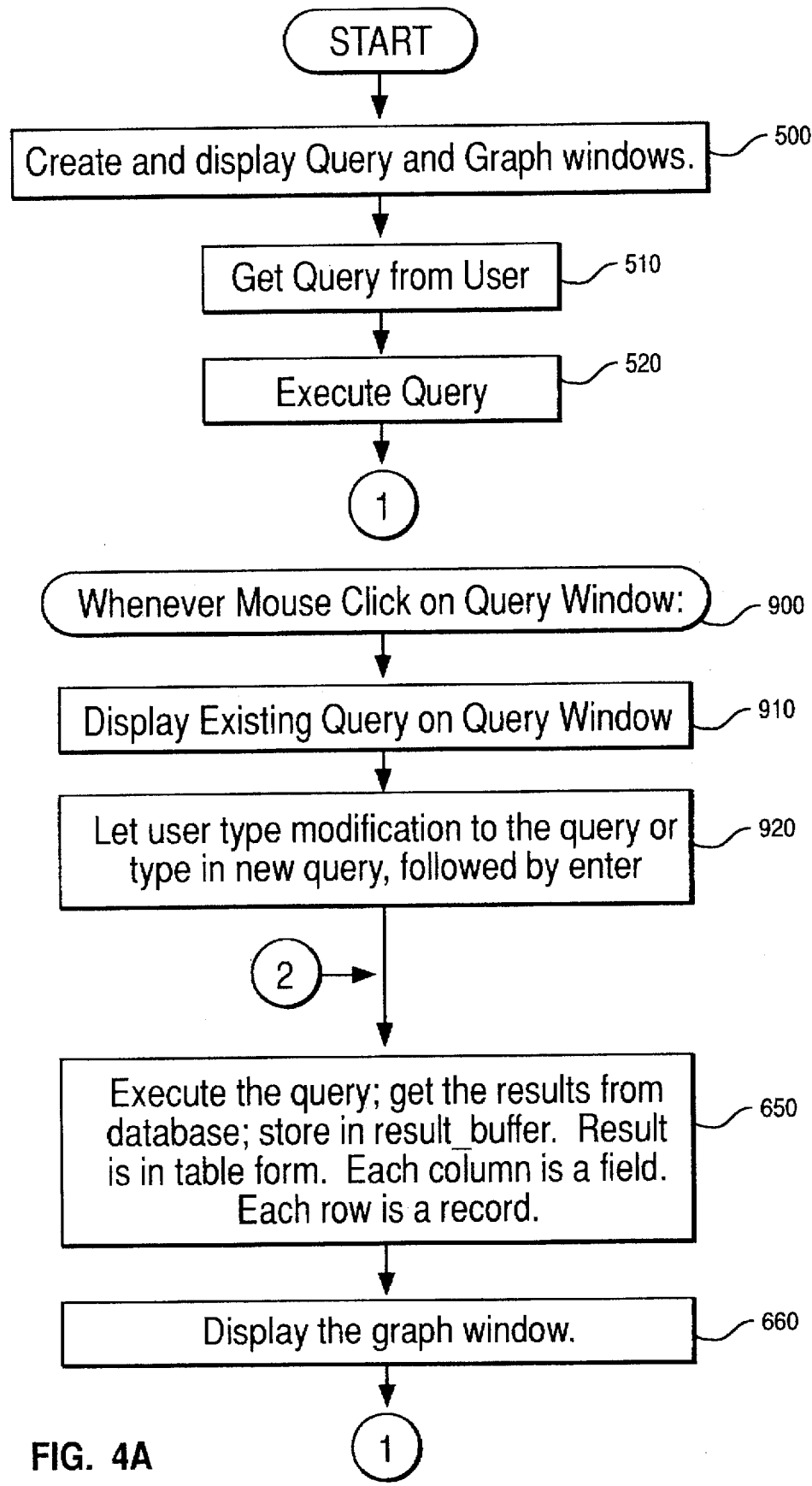
FIGS. 4A-4D illustrate a flowchart for performing a preferred embodiment of the invention.
Figure 4B:
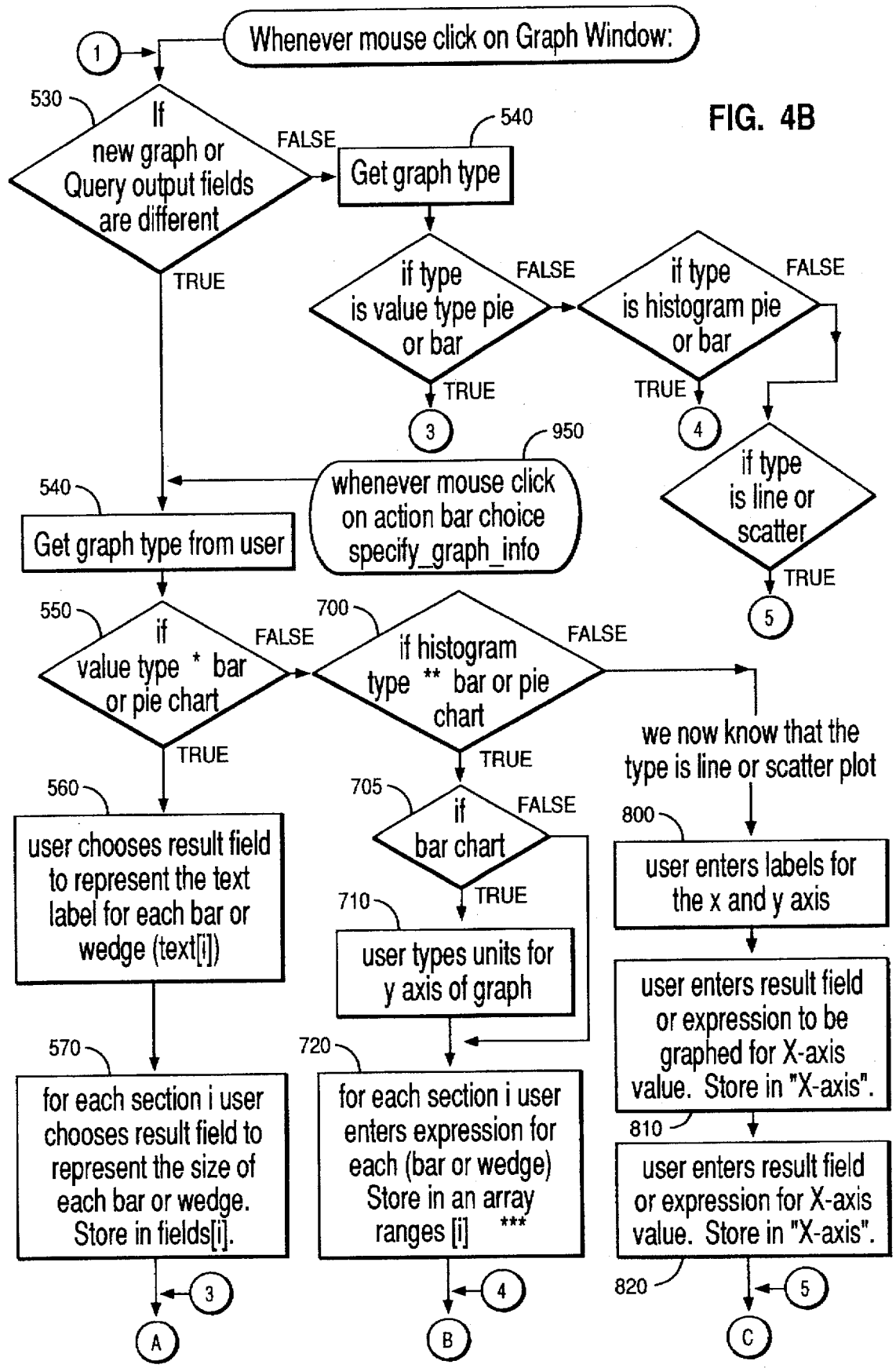
Figure 4C:
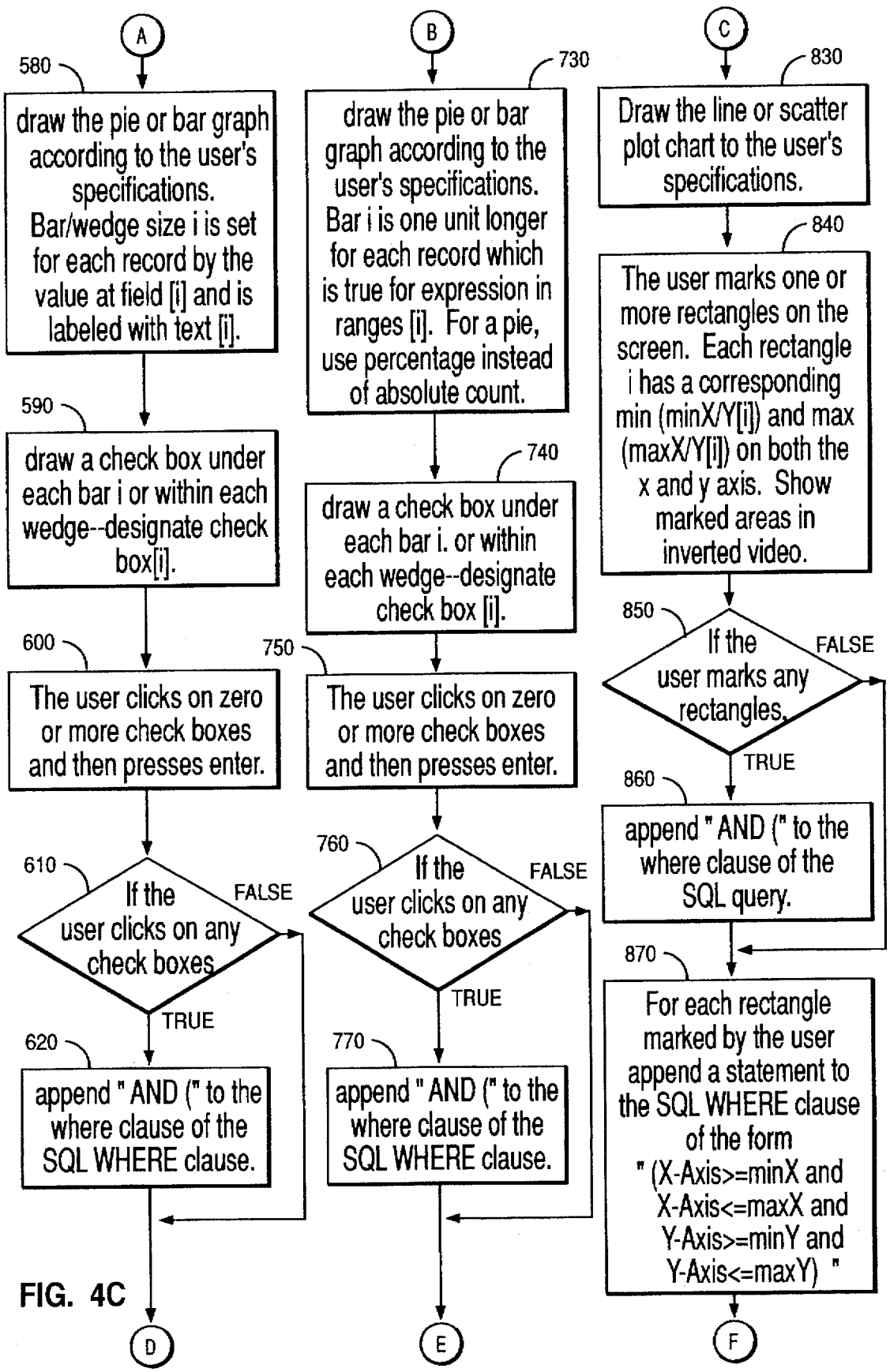
Figure 4D:
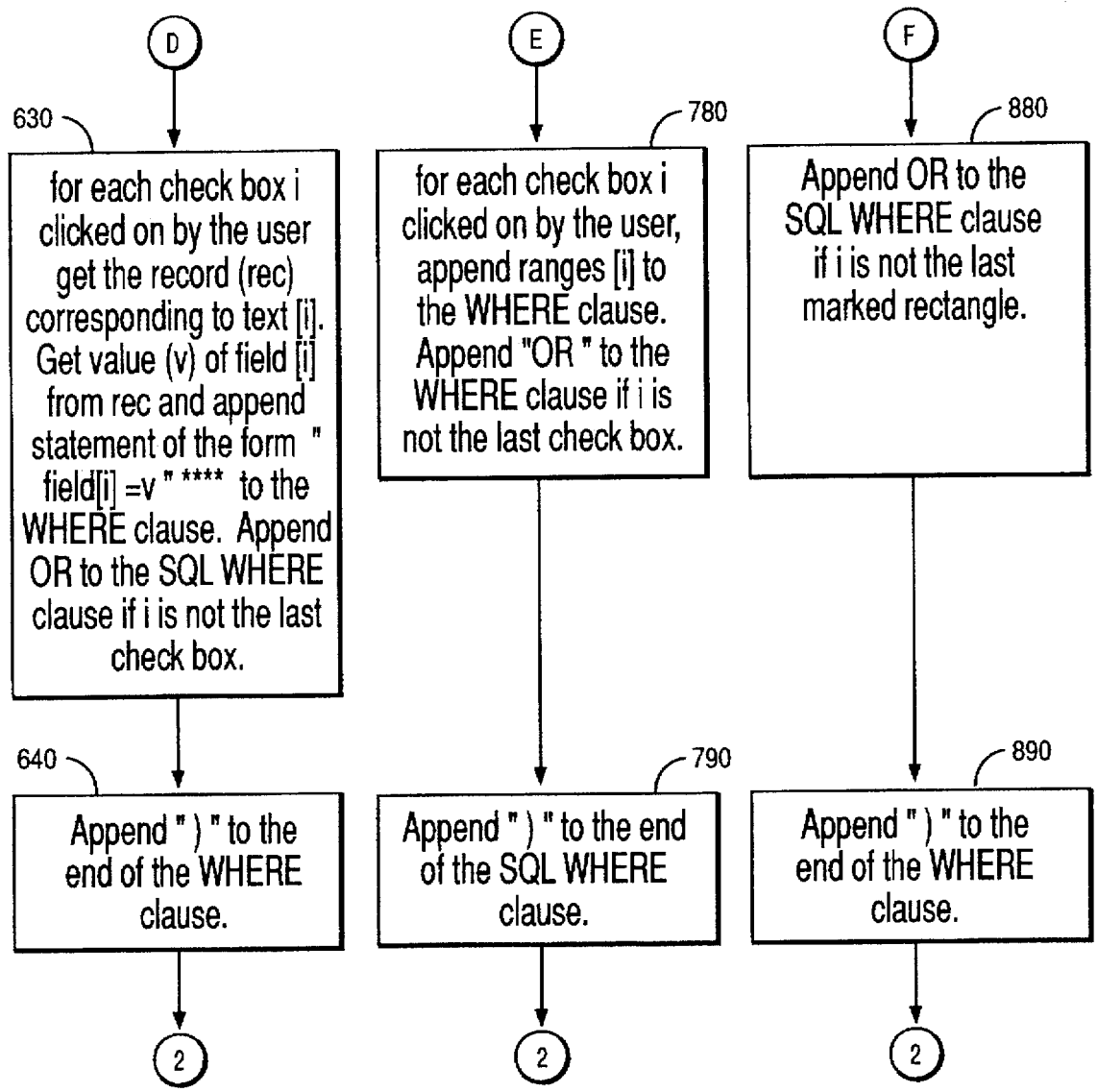

FIG. 3C illustrates that selection with a line chart 350. At this point, the user may wish to see more details about the two downturns that occurred. For a line chart or a scatter diagram, a box (or cube for 3-d graphs) is preferably used to select one or more areas of the chart for further investigation. As shown in FIG. 3D, rectangular boxes 355 and 356 may be used to specify ranges of values to be inspected in greater detail. For unambiguous interpretation on the attribute values represented in a graph's X axis or Y axis, the box is preferably maintained in a horizontal or vertical orientation. This box can be directly manipulated by a user to change its size, shape, and location. The user can drag a corner of the box to re-size it or drag the inner area of the box to move it. The user can invoke multiple boxes as illustrated to generate multiple sets of conditions. As shown in FIG. 3D, the query statement has been modified by the location of the boxes. Once the user presses enter or clicks a second button on the mouse, FIG. 3E is generated to reflect the selection. As shown in FIG. 3E, there occurred a no sale day before each downturn in sales that was not visible in the previous higher level charts. The user can now research how these no sale days occurred to understand why sales dipped in the third quarter. It is readily apparent that the present invention provides easily accessed, powerful, and iterative capabilities to the user to aid in problem solving and data presentation.

FIGS. 4A–4D illustrate a flowchart for performing a preferred embodiment of the invention. In a first step 500, query and graph windows are displayed. In step 510, the user provides a query statement. In step 520, the processing system executes the query, thereby retrieving data from a database for display. In step 530, it is determined whether this is a new graph or query or whether the query fields are different. If so, then in step 540 the graph type is obtained from the user.

In step 550, if the graph type is a bar or pie chart then processing continues to step 560. In step 560, the user chooses a result field to represent the text labels for each bar or wedge. In step 570, for each section the user chooses a result field to represent the sides of each bar or wedge. In step 580, the pie or bar graph is then drawn according to the user specifications. Then, in step 590, a check box is drawn under each bar or within each wedge. In step 600, the user may then click on any desired check boxes and press enter. In step 610, if the user clicked on any check boxes, then processing continues to step 620 else processing continues to step 630. In step 620, an "and (" clause is appended to a WHERE clause in the query statement in the preferred embodiment. This step is to limit the query statement to select data from the database corresponding to the user selected portions of the graph. In step 630, for each check box clicked by the user, a corresponding modification is made to the query statement. That is, each category or range selected is OR'd with each other category or range selected so that the query statement will obtain data from the database corresponding to each selected portion of the graph. In step 640, an ")" is appended to the end of the WHERE clause. In step 650 the modified query is then executed and the result is obtained from the database and stored in the result buffer. In step 660, the graph window is displayed and processing returns to step 530.

In step 550, if the graph type is not a value type bar or pie chart, then processing continues to step 700. In step 700, if it is determined whether the graph type is a histogram type bar or pie chart then processing continues to step 705. If it is determined that in step 705 that the graph type is a bar chart, then in step 710 the user enters the units for a Y axis of the graph. In step 720, the user enters an expression for each bar or wedge of the graph. In step 730, the pie or bar graph is drawn according to the user's specifications. In step 740, a check box is drawn under each bar or within each wedge. In step 750, the user clicks on any desired check boxes and presses enter. In step 760, if the user clicks on any check boxes, then in step 770 an "AND (" is appended to the query statement. In step 780, for each check box clicked by the user, a corresponding modification is made to the query statement as described above with reference to step 630. In step 790, an ")" is appended to the end of the where clause. Processing then continues to step 650 as described above.

In step 700, if it is determined that the graph type is not a histogram type bar or pie chart, then processing continues to step 800. In step 800, the user enters labels for the X and Y axis. In steps 810 and 820, the user enters result fields or expression to be graphed as the X and Y axis values. In step 830, the line or scatter chart is drawn to user specifications. In step 840, the user generates selection boxes around any desired ranges of the line or scatter chart. If, in step 850, it is determined that the user generated some selection boxes, then in step 860 an "AND (" is appended to the query statement. In steps 870 and 880, for each selection box generated by the user, a corresponding modification is made to the query statement as described above with reference to step 630. In step 890, an ")" is appended to the end of the where clause. Processing then continues to step 650 as described above.

Throughout the above described process, the user may use the mouse to click on the query window in step 900. If so, then in step 910, the existing query is displayed in the query window. In step 920, the user may then type in any modifications to the query or type in a new query. Processing then continues to step 650 as described above. The user may also use the mouse to click on a pull down menu bar to change the graph information in step 950. If so, then processing continues to step 540 as described above.

The present invention is not restricted to two dimensional graphics. Using the techniques defined herein, the present invention can also be easily applied to three dimensional graphics. The implementation would be a logical extension of the above described processes, and will be readily apparent to one of ordinary skill in the art. For example, for three dimensional bar or sphere charts, the user could select the desired categories directly with a mouse or check boxes could be provided for each region. For three dimensional surface charts, the user could utilize a three dimensional cube instead of a two dimensional box as described above with reference to the line chart. To avoid any ambiguity in utilizing a three dimensional box, the box would preferably maintain its (x,y,z) axis orientations during user manipulation. In interpreting the effects of direct manipulations on this box, this (x,y,z) axis orientation will be used to determine the meaning of a dragging operations. That is, when a corner of the box is dragged, the box is resized according to the new location of the corner. The user could then toggle between the X-Y, X-Z, and Y-Z planes for the movement of the corner to avoid ambiguity. When a side surface of the box is dragged, the box could be relocated accordingly. The user could also drag endpoints defined on the x, y, and z axis. The implementation is similar to the two dimensional line chart. Instead of providing two conditions (x and y axis) for each box, three conditions are provided (x, y, and z). Conditions within a box are joined by logical ORs. Conditions between boxes are collectively joined with AND conditions.

Figure 5:
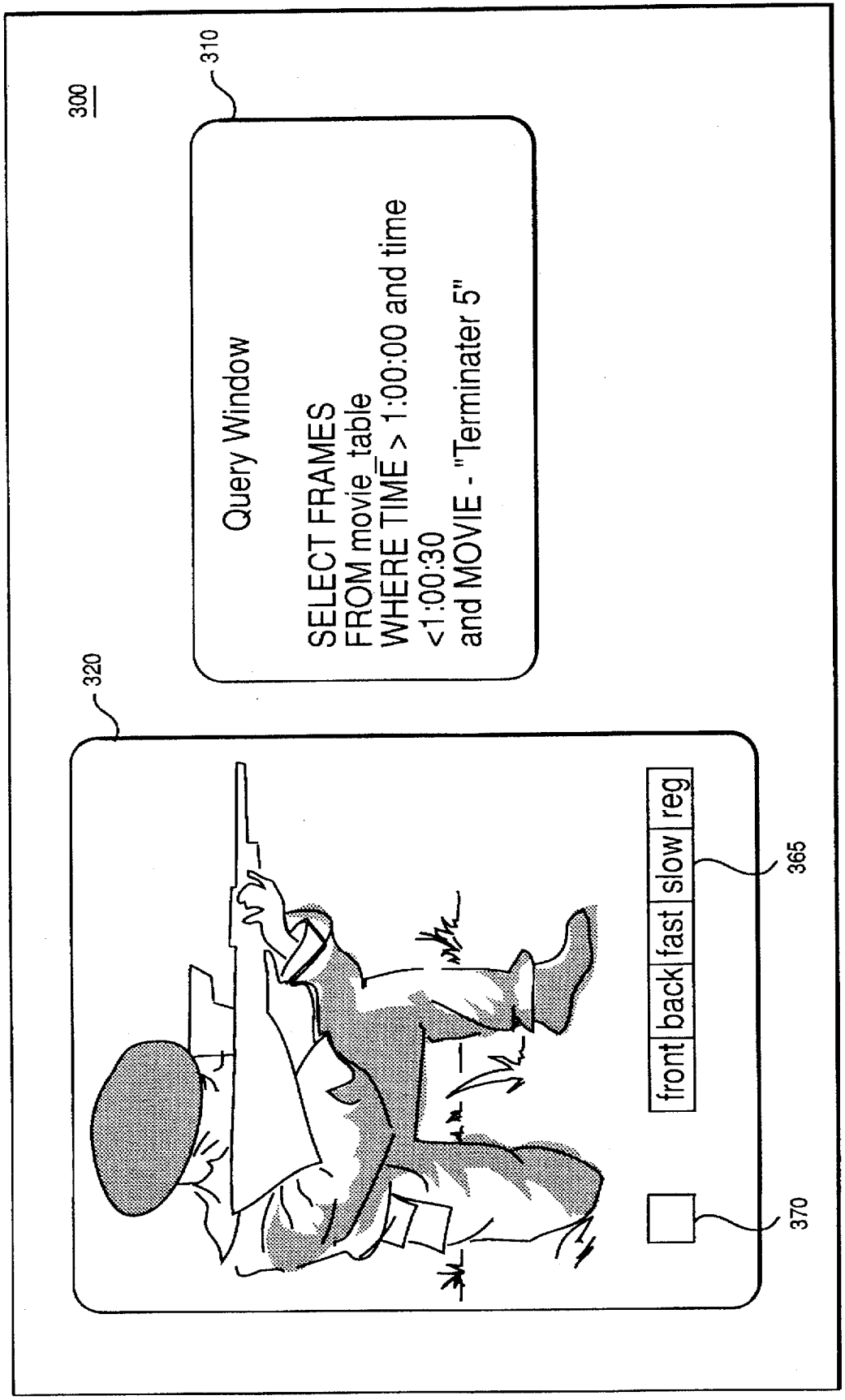
FIG. 5 illustrates generating and utilizing a multimedia application according to a preferred embodiment of the invention.

In addition, the present invention is not restricted to graphs related with business or scientific data only. It can also be applied to graphs for multimedia applications. As depicted in FIG. 5, a film archival system, which when searched will display results in full motion video including sound, is an ideal application. By using the query statement to select a list of frames and by presenting the results in the graph window 320, this present invention can effectively be used to find clips within the database of video. One relational database table could contain records which each have a movie or selection name, the name of the file that contains the movie, a frame identifier that contains the offset within the file of the frame in question, and a time stamp for synchronization purposes where the frame is displayed at this time stamp. The query in query window 310 could read SELECT FRAMES, FROM movie-table, WHERE TIME>1:00:00 and TIME<1:00:30, MOVIE="Terminator 5", and ORDERBYTIME. This query statement would display 30 seconds of video 360 within graph window 320. To make scrolling through the frames effective, buttons 365 for front, back, fast, slow and regular may be used in combination for fast forward (front with fast), fast rewind (back with fast), play (front and regular), play backwards (back with regular), and single step (front or back with slow) could be presented and used. The user could then modify the query statement by selecting desired frames or groups of frames by actually selecting the images as they are displayed or be selecting a check box 370 as the images are displayed. As described above, each selection will modify the query statement provided in the query window. Of course, a separate sound query statement and window may be provided concurrently with a video window, thereby allowing the user to mix various media concurrently.

The present invention has several advantages. Users can more easily modify a database query by simply manipulating a visible graph. A user may investigate a particular portion of a graph without having to determine the exact coordinates of the desired portion. The user may use multiple boxes to specify complicated conditions. In addition, the information displayed in the graphs may include multimedia data such as screen images or audio signals.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An apparatus for modifying a database query comprising:

means for initiating said query;

means for displaying on a display mechanism, each time said query is initiated or reinitiated, said query used and data obtained as a result of said query, said display mechanism including a graph window for displaying said data and a query window for displaying said query; and means for modifying and reinitiating said query by either selecting part of said displayed data in said graph window or by modifying said query in said query window.

2. The apparatus of claim 1 further comprising means for iteratively actuating said means for displaying and said means for modifying and reinitiating.

3. The apparatus of claim 1 wherein the means for modifying and reinitiating said query by selecting said displayed data includes means for utilizing a variable sized box to select portion of said displayed data.

4. The apparatus of claim 1 wherein the means for modifying and reinitiating said query by selecting said displayed data includes means for selecting multiple portions of the displayed data.

5. The apparatus of claim 1 wherein the means for modifying and reinitiating said query by selecting said displayed data includes means for selecting a check box in said graph window.

6. A method for modifying a database query comprising the steps of:

initiating said query;

displaying on a display mechanism, each time said query is initiated or reinitiated, said query used and data obtained as a result of said query, said display mechanism including a graph window for displaying said data and a query window for displaying said query; and modifying and reinitiating said query by either selecting part of said displayed data in said graph window or by modifying said query in said query window.

7. The method of claim 6 further comprising the step of repeating the steps of displaying, selecting and modifying.

8. The method of claim 6 wherein the step of modifying said query by selecting part of said displayed data includes utilizing a variable sized box to select said displayed data.

9. The method of claim 6 wherein the step of modifying said query by selecting part of said displayed data includes selecting multiple portions of the displayed data.

10. The method of claim 6 wherein the step of modifying said query by selecting part of said displayed data includes selecting a check box in said graph window.

11. A data processing system for modifying a database query comprising:

memory means for storing database data;

processing means for processing said stored database data;

means for initiating said query;

means for displaying on a display mechanism, each time said query is initiated or reinitiated, said query used and data obtained as a result of said query, said display mechanism including a graph window for displaying said data and a query window for displaying said query; and means for modifying and reinitiating said query by either selecting part of said displayed data in said graph window or by modifying said query in said query window.

12. The data processing system of claim 11 further comprising means for iteratively actuating said means for displaying, means for selecting and means for modifying.

13. The data processing system of claim 11 wherein the means for modifying said query by selecting part of said displayed data includes means for utilizing a variable sized box to select said displayed data.

14. The data processing system of claim 11 wherein the means for modifying said query by selecting part of said displayed data includes means for selecting simultaneously multiple portions of the displayed data.

15. The data processing system of claim 11 wherein the means for modifying said query by selecting part of said displayed data includes means for selecting a check box from said graph window.

16. A computer program product stored in memory executable by a processor for modifying a database query comprising:

means for initiating said query;

means for displaying on a display mechanism data obtained as a result of said query, said display mechanism including a graph window for displaying said data and a query window for displaying said query; and means for modifying said query by either selecting part of said displayed data in said graph window or by modifying said query in said query window.

17. The computer program product of claim 16 further comprising means for iteratively actuating said means for displaying, means for selecting and means for modifying.

18. The computer program product of claim 16 wherein the means for modifying said query by selecting part of said displayed data includes means for utilizing a variable sized box to select said displayed data.

19. The computer program product of claim 16 wherein the means for modifying said query by selecting part of said displayed data includes means for selecting multiple portions of the displayed data.

20. The computer program product of claim 16 wherein the means for modifying said query by selecting part of said displayed data includes means for selecting a check box from said graph window.

* * * * *

UNITED STATES PATENT AND TRADEMARK OFFICE
CERTIFICATE OF CORRECTION

PATENT NO. : 5,734,888
DATED : Mar. 31, 1998
INVENTOR(S) : Li et al

It is certified that error appears in the above-identified patent and that said Letters Patent is hereby corrected as shown below:

Column 7, line 43: after "selecting", insert --a--.

Signed and Sealed this

Twelfth Day of January, 1999

Attest:

Attesting Officer

*Acting Commissioner of Patents and Trademarks*